Sept. 26, 1939.   J. G. VINCENT   2,174,148
TRANSMISSION MECHANISM
Filed July 10, 1930
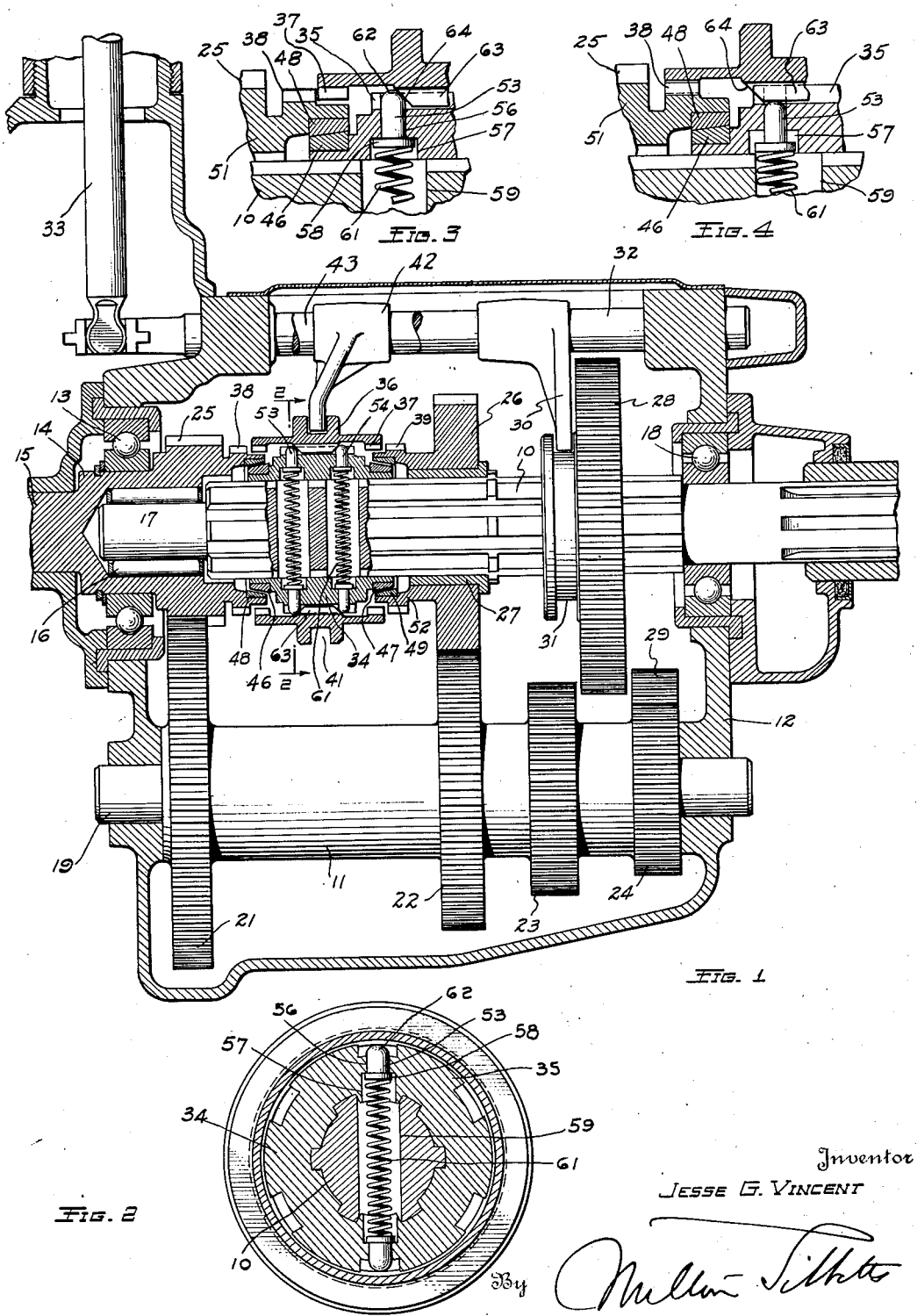
Inventor
JESSE G. VINCENT
By
Attorney Patented Sept. 26, 1939

2,174,148

UNITED STATES PATENT OFFICE 2,174,148

TRANSMISSION MECHANISM

Jesse G. Vincent, Detroit, Mich., assignor to Packard Motor Car Company, Detroit, Mich., a corporation of Michigan Application July 10, 1930, Serial No. 466,949

9 Claims. (Cl. 192—53)

This invention relates to motor vehicles and more particularly to the transmission mechanism of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the contingencies of vehicle operation may dictate, so that gear changing has come to be considered as perhaps the most difficult task incident to the operation of a motor vehicle.

To assist the operator in making rapid and quiet shifts, it has been previously proposed to synchronize the gears to be meshed by various means, such as friction clutches. Such devices, however, have been open to certain objections. The mechanisms employed have been in general cumbersome and complicated, and the operating means have been subjected to excessive wear, and in the more effective devices have been of a nature such as to require release of the synchronizing member immediately upon engagement of the gears or positive driving means. This, in turn, has required delicate and complicated timing mechanism.

One of the objects of this invention is to provide a motor vehicle transmission having an improved device for synchronizing the toothed clutch elements, which shall be simple and effective, and in which it is unnecessary to release the device after meshing of the clutch elements is effected.

Another object of the invention is to provide a motor vehicle transmission with a device of the character designated in which the operation of the synchronizing clutches shall be effective through rotating parts not subjected to high relative speeds, and in which accurate timing of the application and release shall be unnecessary.

Another object of the invention is to provide a transmission synchronizing device in which movement of the synchronizing clutch shall be derived from shifting movement of the transmission toothed clutch mechanism up to a predetermined engagement pressure on said synchronizing clutch, after which the connecting means shall be retracted to permit completion of the shifting movement.

Other objects of the invention will appear from the following description taken in connection with the drawing, which forms a part of this specification, and in which:

Fig. 1 is a view, partially in side elevation and partially in longitudinal vertical section through a motor vehicle transmission embodying the present invention;

Fig. 2 is a section taken substantially on the line 2—2 of Fig. 1, and

Figs. 3 and 4 are detail sectional views to a larger scale of part of the transmission shown in Fig. 1, illustrating successive positions of the device.

Referring to the drawing, in Fig. 1 is shown a motor vehicle transmission comprising a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23, and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27, pressed or otherwise rigidly mounted on the shaft 10 as will be readily understood.

Gears 23 and 24 constitute the low speed and reverse gears respectively, and are adapted to drive a gear 28 which is splined to and slidable on the shaft 10, this gear 28 being directly engageable with the gear 23. It may also be driven from the gear 24 through a reverse idler pinion 29 in the well known manner. The sliding action on shaft 10 is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a shift lever 33 of usual form which may be manually operated by the vehicle driver in the well known manner.

Thus in the illustrated embodiment of the invention, gear 28 may be moved to mesh with gear 23, to provide a first speed, or connected through pinion 29 to gear 24 to provide a reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft between the gears 25 and 26. This constitutes a splined hub portion 34, slidably mounted on the splines of the shaft 10 and having external splines 35 on which is slidably mounted a positive clutch member or ring 36. This member 36 is formed at its ends with clutch teeth elements 37, which may be engaged, by sliding the member axially, either with clutch teeth 38 formed on the shaft portion 14 adjacent the pinion 25, or with clutch teeth 39 formed on the body of gear 26, both sets of the clutch teeth 37, and the clutch teeth 38 and 39 being of the same pitch.

To effect the sliding or shifting movement of the clutch ring, this member is provided with a shifter groove 41, actuated by a shifter fork 42 which is connected to a shifter rod 43, similar to the rod 32 and likewise selectively operated by the gear shift lever 33.

To perform the clutching operation described without shock or clash, this invention provides a synchronizing device adapted to bring the pairs of clutch teeth 37—38 or 37—39 to the same speed before positive engagement. For this purpose, the oppositely disposed ends of the hub portion 34 are provided with conical brake or friction surfaces 46 and 47, which may be detachable rings if desired. The surface 46 is adapted to contact a conical friction clutch ring 48, carried by the shaft portion 14, when the hub 34 is moved forwardly or toward the left in Fig. 1. The surface 47 is adapted to contact a similar friction clutch ring 49, carried by the gear 26, when the hub is moved rearwardly or toward the right. These rings may be of any suitable material, such as bronze, and are preferably formed as independent members, pressed or otherwise secured on the shaft end and on the gear body, respectively.

The corresponding members 46—48 or 47—49 of each of these friction clutch devices are so spaced as to be engaged upon a relatively small axial movement of the hub 34 from its neutral position, and with considerable pressure, so that the relatively rotating members are synchronized by being frictionally connected before intermeshing contact of the positive clutch device.

In accordance with this invention, operation of the synchronizing or friction clutch device is effected by the movement toward clutching position of the clutch ring or member 36, through suitable mechanism. As shown, this comprises pairs of abutments or plungers transversely disposed in the hub member 34 and projecting therefrom to engage the clutch ring 36 upon axial movement thereof. One of the pairs of plungers 53 is thus engaged upon a forward movement of the clutch ring toward third speed position, and the other pair 54 is engaged upon rearward movement toward second speed position. The plungers are mounted in diametrically aligned bores 56 which are counterbored as at 57 to receive head portions 58 on the plungers, whereby radial outward movement of the plungers is limited. The counterbores 57 of each pair register with larger bores 59 extending transversely through the shaft 10, in each of which is disposed a spring 61. This spring seats at its ends on the head portions 58 of the pair of plungers, which are thereby resiliently urged radially outward.

The outer end of each of the plungers 53 and 54 is rounded as indicated at 62 for cooperation with a suitable cam surface on the clutch ring 36. For this purpose the two splines of the clutch ring which are disposed in the axial plane of the bores 56 are cut away at their ends, leaving a central portion 63 having inclined end faces forming cam surfaces 64. The cam portion 63 is thus disposed between the pairs of plungers 53 and 54 when the transmission is in neutral position, as clearly shown in Fig. 1.

The operation of this device will be readily understood from the foregoing description. Assuming that it is desired to change the gear ratio in the vehicle transmission from second speed to high speed, and that the second speed connections have already been disengaged, the parts are in neutral position as shown in Fig. 1, the main engine clutch being disengaged, the clutch shaft 15 stopped or rotating slowly, while the shaft 10 is being driven from the vehicle at a somewhat greater speed. From this position the operator first moves the clutch ring 36, through the shifter rod 43 and lever 33, forwardly or toward the left in the direction of the clutch teeth 38. This also carries forward the cam portion 63, so that the cam 64 engages the rounded end of the plungers 53 and through them carries the hub 34 in the same direction. This movement brings the friction member 46 into powerful frictional engagement with the member 48 with a high axial pressure, frictionally connecting the shafts 10 and 15, so that the shaft 15 is rapidly brought to the speed of the shaft 10. At this stage of the operation the pars are in the position shown in Fig. 3.

Continued movement of the clutch ring 36 is resisted by the axial reaction to the pressure exerted upon the friction face 46, this pressure being transmitted between the cam members 53 and 64. When this axial pressure exceeds a predetermined amount, there is a cam action of the face 64 on the rounded end 62 of the plunger 53, which compresses the spring 61 so that the plungers are depressed in their bores 56, as shown in Fig. 4. In this depressed position the members 63 ride over the ends of the plungers, permitting the ring 36 to continue its forward movement, the ends of the plungers riding on the top of the members 63. The teeth 37 then easily slide into intermeshing engagement with the teeth 38, and the shafts 15 and 10 are now directly and positively coupled together, giving a direct drive for the vehicle.

This operation has been described in connection with a gear ratio change from second to high but the change down from high to second gear is effected in a similar manner as will be readily understood. In this case the clutch ring 36 is moved to first engage the friction faces 47 and 49, and then to connect the clutch teeth 37 and 39. In this case the plungers 54 are depressed to permit engagement of the clutch teeth in the manner previously described.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a motor vehicle transmission having a driving member and a driven shaft, a friction clutch device splined to said shaft and slidable thereon to engage the driving member, clutch teeth on said driving member, a toothed clutch device splined to the friction clutch device and slidable thereon to engage said clutch teeth, a pair of plungers diametrically oppositely disposed in the friction clutch device having rounded ends adapted to project into the path of movement of the toothed clutch device, and spring means within the driven shaft urging said plungers toward said toothed device.

2. In a motor vehicle transmission having a driving member and a driven shaft, a friction clutch device splined to said shaft and slidable thereon to engage the driving member, clutch teeth on said driving member, a toothed clutch device splined to the friction clutch device and slidable thereon to engage said clutch teeth, one of the splines of the said toothed clutch device having a beveled end face, a plunger transversely disposed in the friction clutch device having a rounded end adapted to engage said beveled face, and spring means to resiliently resist depression of said plunger by said face.

3. In a motor vehicle transmission having a driving member and a driven shaft, a cone clutch device splined to said shaft and slidable thereon, a friction clutch element on the driving member, clutch teeth on said member adjacent said clutch element, a clutch sleeve splined to said cone clutch device and slidable thereon to selectively engage said clutch teeth, said sleeve having splines with beveled ends, plungers disposed in said cone clutch device having cam ends adapted to engage said beveled spline ends, and means within said driven shaft resiliently opposing depression of the plungers by said beveled ends to transmit a predetermined axial pressure from the sleeve to the clutch device.

4. In a motor vehicle transmission, a driving member, a driven member, a positive clutch including a shiftable element between the members, a friction clutch between the members, and connecting means including plungers intermediate said clutches and partly within said driven member, said plungers forming a positive connection between the clutches for applying the friction clutch in advance of the positive clutch element and then moving bodily during the remainder of the application movement of the positive clutch element to break the positive connection between the clutches to allow application of the positive clutch element without increasing the application pressure on the friction clutch.

5. In a motor vehicle transmission, a driving member, a driven member, positive clutch means including a shiftable element to connect said members, friction clutch means between said members engageable in advance of the positive clutch element, and means including a pair of plungers operated by initial movement of the positive clutch element to engage the friction clutch, and means independent of said driven member for yieldably urging said plungers outwardly.

6. In a motor vehicle transmission having a driving member and a driven shaft, a cone clutch device splined to said shaft and slidable thereon, a clutch element on the driving member with which the cone clutch device cooperates, clutch teeth on said driving member adjacent said clutch element, a clutch sleeve splined to said cone clutch device and slidable thereon to selectively engage said clutch teeth, said sleeve having a pair of splines with beveled end faces, plungers disposed in said cone clutch device having cam ends adapted to engage said beveled faces, and spring means mounted in said driven shaft and engaging said plungers to resiliently oppose depression thereof by said faces upon movement of said sleeve.

7. In a motor vehicle transmission having a driving member and a driven shaft, a cone clutch device splined to said shaft and slidable thereon, a friction clutch element on the driving member, clutch teeth on said member adjacent said clutch element, a clutch sleeve splined to said cone clutch device and slidable thereon to selectively engage said clutch teeth, and means located in said cone clutch device and said driven shaft to yieldably couple said sleeve to said clutch device including cam members carried by the cone clutch device and arranged in the path of the sleeve, said members being yieldable on a predetermined axial pressure to permit movement of said sleeve with respect to said cone clutch device.

8. In a synchronizer for change speed gearing, the combination with coaxial driving and driven shafts, of a clutch member rigid with one of said shafts, said clutch member having a friction clutch portion and a positive clutch portion, said positive clutch portion being formed to provide radial external clutch teeth, a hub supported on the other of said shafts for rotation therewith and for axial movement thereon, said hub having a friction clutch portion and a positive clutch portion, said positive clutch portion of the hub being formed to provide radial external clutch teeth, an axially movable locking member supported on said hub for rotation therewith and for axial movement with respect thereto, said locking member being provided with radial internal clutch teeth for engaging the clutch teeth on the clutch member, the locking member being adapted to positively connect the said hub and clutch member for unitary rotation, the hub constituting the sole means for transmitting torque between said locking member and the shaft on which the hub is supported, means for axialy displacing said locking member from a neutral position to an operative position in engagement with the clutch teeth on the clutch member, and spring pressed members positioned in the hub for resiliently locking said locking member and hub together for concurrent axial movement, whereby said hub may be yieldingly carried with said locking member during initial axial movement of the latter from neutral position to effect frictional engagement between the friction clutch portions of the hub and clutch member prior to engagement of the positive clutch portions of the clutch member and locking member.

9. In a device of the class described the combination of coaxial driving and driven shafts, a gear fast on the driving shaft, a second gear rotatable on the driven shaft, a clutch member rigid with each of said gears, each clutch member having radial external clutch teeth the pitch circles of said clutch teeth of both clutch members being the same but the pitch circle of said clutch teeth of each member being different from the pitch circle of the gear with which the respective member is rigid, and said clutch members also having like friction clutch portions, a symmetrical hub surrounding and supported on the driven shaft for rotation therewith and for axial movement thereon, the hub having like friction clutch portions complemental to said friction clutch portions on said clutch members, an axially movable locking member surrounding and supported wholly on said hub for rotation therewith and for axial movement with respect thereto and having radial internal clutch teeth portions for engaging the clutch teeth on said clutch members, the locking member being adapted to positively and selectively connect the hub and either of said clutch members for unitary rotation, and spring presed members mounted in said hub member for resiliently connecting axially together said hub and said locking member.

JESSE G. VINCENT.